(12) United States Patent
Cheng et al.

(10) Patent No.: US 12,228,532 B2
(45) Date of Patent: Feb. 18, 2025

(54) GAS DETECTION PROBE INCLUDING COMPACT DESIGN

(71) Applicant: HANGZHOU SANHUA RESEARCH INSTITUTE CO., LTD., Hangzhou (CN)

(72) Inventors: Dezhi Cheng, Hangzhou (CN); Yuxiang Zhang, Hangzhou (CN); Longzhong Huang, Hangzhou (CN); Qihong Jin, Hangzhou (CN); Linjie Huang, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 239 days.

(21) Appl. No.: 17/949,250

(22) Filed: Sep. 21, 2022

(65) Prior Publication Data

US 2023/0098849 A1 Mar. 30, 2023

(30) Foreign Application Priority Data

Sep. 28, 2021 (CN) .......................... 202111140269.6

(51) Int. Cl.
*G01N 27/04* (2006.01)
*G01M 3/16* (2006.01)

(52) U.S. Cl.
CPC ............ *G01N 27/045* (2013.01); *G01M 3/16* (2013.01)

(58) Field of Classification Search
None
See application file for complete search history.

(56) References Cited

U.S. PATENT DOCUMENTS

| 9,322,680 | B2 * | 4/2016 | Yonezu | .................. G01D 11/30 |
| 2017/0212090 | A1 * | 7/2017 | Kume | ................. G01N 27/4077 |
| 2021/0156795 | A1 * | 5/2021 | Wan | ......................... G01J 5/046 |

* cited by examiner

*Primary Examiner* — Brandi N Hopkins
*Assistant Examiner* — Nigel H Plumb
(74) *Attorney, Agent, or Firm* — Cheng-Ju Chiang

(57) ABSTRACT

A gas detection probe includes a shell and a detection element. The detection element includes a first element and a second element. The shell includes a first shell portion, a second shell portion, and a third shell portion. The second shell portion and the third shell portion are mated and formed on an outer periphery of the first shell portion. The shell has a first cavity and a second cavity. The first shell portion is in sealing engagement with the third shell portion. The second shell portion is provided with a guide hole portion communicated with the second cavity. The first element is accommodated in the first cavity. The second element is accommodated in the second cavity. The gas detection probe of the present disclosure is more beneficial to realize miniaturization. A manufacturing method of the gas detection probe is also disclosed.

13 Claims, 9 Drawing Sheets

GAS DETECTION PROBE INCLUDING COMPACT DESIGN

CROSS-REFERENCE TO RELATED APPLICATION

This patent application claims priority of a Chinese Patent Application No. 202111140269.6, filed on Sep. 28, 2021 and titled "GAS DETECTION PROBE AND MANUFACTURING METHOD THEREOF", the entire content of which is incorporated herein by reference.

TECHNICAL FIELD

The present disclosure relates to a technical field of signal detection, in particular to a gas detection probe and a manufacturing method of the gas detection probe.

BACKGROUND

In the related art, there is a gas sensing device using a thermal conductivity detection principle to detect concentration of carbon dioxide gas. The gas sensing device utilizes a characteristic that a resistance value of a sensing element changes with change of target gas concentration, so that the detection of the concentration of the carbon dioxide gas can be realized.

However, in the related art, such gas sensing device has a gas detection probe. A shell of the gas detection probe is provided with left and right cavities side by side, in which one cavity is closed and the other cavity is communicated with the environment. Each cavity receives a thermistor-type sensing element. However, the shell of this gas detection probe occupies a large space in a lateral direction of the cavity, which is difficult to achieve miniaturization. Therefore, it is desirable to improve the related technology.

SUMMARY

The present disclosure provides a gas detection probe which is beneficial to realize miniaturization. Besides, the present disclosure also provides a manufacturing method of the gas detection probe.

In one aspect, the present disclosure provides a gas detection probe including a detection element and a shell, the detection element including a first element and a second element, a resistance value of the detection element being changeable with change of gas concentration;
  the shell including a first shell portion, a second shell portion and a third shell portion, at least part of the first shell portion and at least part of the second shell portion protruding beyond the third shell portion along a height direction of the gas detection probe, the second shell portion and the third shell portion being mated and formed at an outer peripheral side of the first shell portion, at least part of the second shell portion circumferentially surrounding the first shell portion;
  wherein the shell has a first cavity and a second cavity which are not communicated, at least part of the first shell portion is located between the first cavity and the second cavity, the first shell portion is in sealing connection with the third shell portion, the first cavity is hermetically arranged, the second shell portion is provided with a guide hole portion extending therethrough, the guide hole portion communicates with the second cavity, the first element is accommodated in the first cavity, and the second element is accommodated in the second cavity.

In the gas detection probe provided by the present disclosure, both the first shell portion and the second shell portion protrude beyond the third shell portion, the second shell portion and the third shell portion are mated with each other and formed at the outer peripheral side of the first shell portion, at least part of the second shell portion circumferentially surrounds the first shell portion, the first shell portion is hermetically connected to the third shell portion, and at least a portion of the first shell portion is located between the first cavity and the second cavity. This arrangement is beneficial to reduce a space occupied by the shell of the gas detection probe in a direction perpendicular to the height direction, so that the structure of the shell portion is more compact. Accordingly, miniaturization of the gas detection probe is facilitated.

In another aspect, the present disclosure provides a manufacturing method of a gas detection probe, wherein the manufacturing method includes following steps:
  providing an assembly including a third shell portion and a plurality of conductive terminals, the conductive terminals being hermetically connected to the third shell portion;
  fixing a first element with a part of the plurality of conductive terminals to realize electrical connection;
  providing a first shell portion, and hermetically connecting the first shell portion with the third shell portion, to accommodate the first element in a closed cavity formed by mating the first shell portion and the assembly; and
  providing a second shell portion having a guide hole portion, and fixing the second shell portion and the third shell portion, to accommodate both the first shell portion and a second element in a receiving space formed by mating the second shell portion and the assembly; wherein the second element is fixed with another part of the plurality of conductive terminals to realize electrical connection.

By hermetically connecting the first shell portion and the third shell portion, the first element is accommodated in the closed cavity formed by the first shell portion and the assembly; and by fixing the second shell portion and the third shell portion, the first shell portion and the second element are both accommodated in the receiving space formed by the second shell portion and the assembly, the method for manufacturing the gas detection probe provided by the present disclosure is more beneficial to reduce the space occupied by the shell of the gas detection probe in a direction perpendicular to the height direction. Accordingly, it is beneficial to manufacture a more miniaturized gas detection probe.

DETAILED DESCRIPTION

Figure 1:
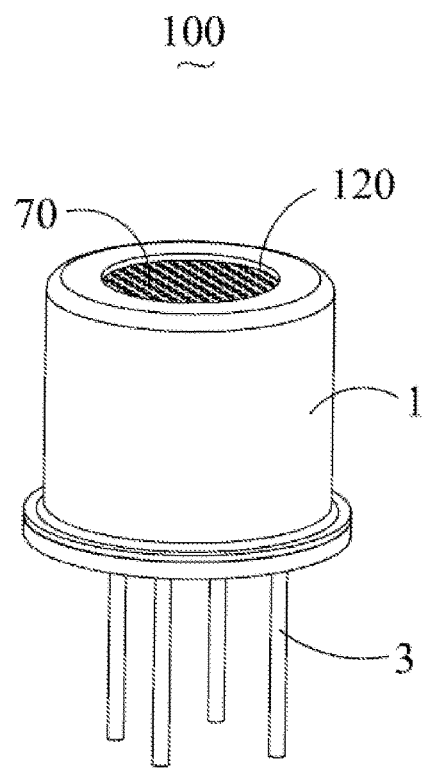
FIG. 1 is a schematic perspective structural view of a gas detection probe in accordance with an embodiment of the present disclosure.
Figure 2:
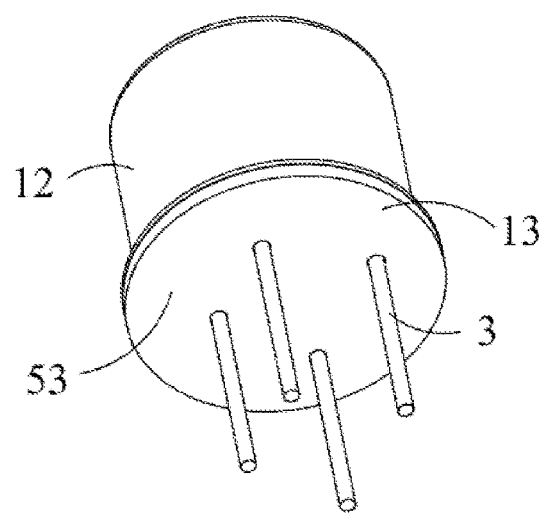
FIG. 2 is a schematic perspective structural view of the gas detection probe shown in FIG. 1 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Refrigerants such as Freon (R22) used in air conditioning systems can cause damage to the atmospheric ozone layer, which can easily lead to the formation of a hole in the ozone layer, allowing sunlight to directly irradiate the surface of the earth. In order to protect the atmospheric ozone layer, R32 (chemical name is difluoromethane, which is a halogenated hydrocarbon, and chemical formula thereof is $CH_2F_2$) is used as a refrigerant in current air conditioning systems. However, R32 is slightly flammable and can form explosive mixtures when mixed with the air. R32 may burn and explode when exposed to heat sources or open flames, posing a potential safety hazard. Therefore, real-time detection of R32 concentration for the air around the air conditioning system is one of the means to eliminate potential safety hazards.

At present, in the related art, a gas sensor using the semiconductor principle is used to detect parameters such as the concentration of the R32 refrigerant gas. However, the gas sensor based on the semiconductor principle requires a chemical reaction of oxidation-reduction with the R32 refrigerant gas through a gas-sensitive material under high temperature conditions. Both the reaction process and the high temperature conditions have a certain consumption of the gas-sensitive material. Therefore, the gas sensor based on the semiconductor principle has a relatively short service life and cannot meet the requirement of long-term use. There is no gas sensor with a long service life which can detect R32 refrigerant gas in most application scenarios in the related art.

In different gas detection fields, there are some technologies that use thermal conductivity principle gas sensors to detect carbon dioxide gas. The thermal conductivity gas sensor utilizes the different thermal conductivity characteristics of different types of measured gases to detect some key parameters of carbon dioxide gas. A probe portion of the above thermal conductivity gas sensor has two thermistors packaged in a same shell, one thermistor is placed as a reference element in a closed gas chamber, and the other is placed as a detection element in an open air chamber. However, for the probe of the above thermal conductivity type gas sensor, the closed air chamber and the open air chamber are arranged in a lateral direction of the probe, the shell structure is large, and the requirement for the installation space is high. In the field of air conditioning and refrigeration, especially a vehicle air conditioning system and some pipeline systems for refrigerant flow, the size requirements of the sensor itself are relatively strict. Therefore, the relatively large shell size of the thermal conductivity type gas sensor for measuring carbon dioxide gas is difficult to meet the requirements for R32 refrigerant gas detection in the field of air conditioning. In addition, some application scenarios of the air conditioning system are also relatively humid, and it is necessary to avoid exposing large areas of metal shells to the environment as much as possible. Therefore, related technologies need to be improved.

A gas detection probe provided by the present disclosure can be applied to a gas detection device, for example, the gas detection probe is electrically connected to a circuit board of the gas detection device. The gas detection device can be applied to air conditioning systems such as household air conditioners and vehicle air conditioners, and can also be applied to refrigeration equipment such as refrigerators. The air conditioning system may include refrigerant conveying components (such as pipelines connected to heat exchangers or internal passages of the heat exchangers, etc.,) for conveying refrigerants (such as R32). The gas detection device can be used for the gas concentration around each component of the air conditioning system to determine whether there is refrigerant leakage and other phenomena, which is beneficial to eliminate potential safety hazards. Of course, in some other embodiments, the gas detection device can also be used to detect other types of gas.

For example, the gas detection device is used to detect the gas concentration in a surrounding environment and give an alarm. The gas detection probe in the gas detection device can collect a gas concentration signal. The collected gas concentration signal is transmitted to a processing unit of the gas detection device, and processed by the processing unit of the gas detection device. Therefore, the gas detection device and the air conditioning system can take corresponding countermeasures, such as alarm processing, to ensure the safety of the air conditioning system.

As shown in FIGS. 1 to 10, the present disclosure provides a gas detection probe 100 including a shell 1 and a detection element 2. The detection element 2 includes a first element 21 and a second element 22. A resistance value of the detection element 2 can be changed with the change of gas concentration. For example, the detection element 2 may be a thermistor element, or a thermistor chip integrated with relevant functions of the thermistor element, or the like.

The shell 1 includes a first shell portion 11, a second shell portion 12 and a third shell portion 13. At least part of the first shell portion 11 and at least part of the second shell portion 12 both protrude beyond the third shell portion 13 in a height direction of the gas detection probe 100. The height direction of the gas detection probe 100 may refer to a top-bottom direction in FIG. 1. At least part of the second shell portion 12 circumferentially surrounds the first shell portion 11. In this way, components such as the second shell portion 12 and the third shell portion 13 can be jointly enclosed to form a receiving space for receiving the first shell portion 11. The first shell portion 11, the second shell portion 12 and the third shell portion 13 may all be independent shells.

In some embodiments of the present disclosure, the first shell portion 11 and the third shell portion 13 are hermetically connected by welding or bonding. The second shell portion 12 and the third shell portion 13 are connected by welding or bonding, or the second shell portion 12 and the third shell portion 13 are integrally formed.

Figure 4:
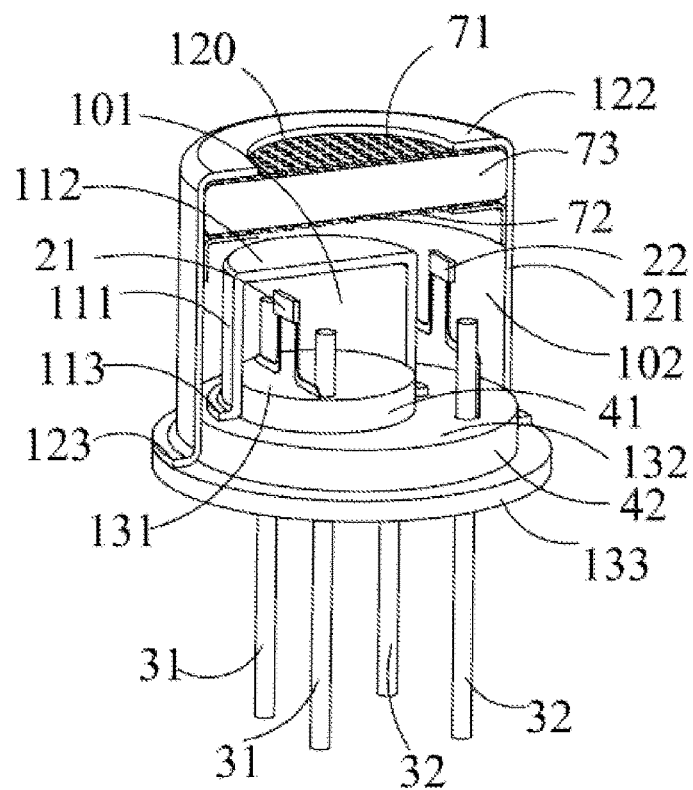
FIG. 4 is a schematic perspective cross-sectional view of the gas detection probe shown in FIG. 1.
Figure 5:
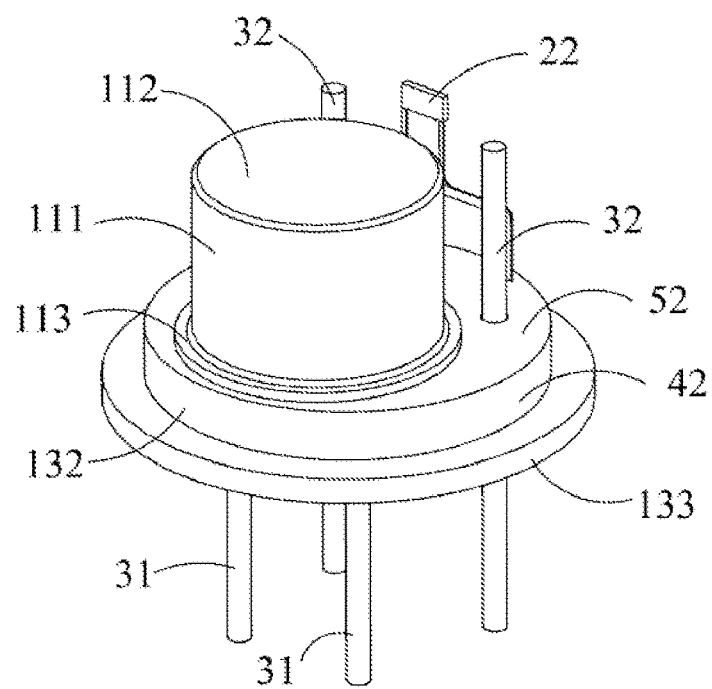
FIG. 5 is a schematic structural view of a part of structures of a gas detection probe of the present disclosure when assembled together.

In some embodiments, as shown in FIG. 4, a height of the second shell portion 12 protruding relative to the third shell portion 13 is higher than a height of the first shell portion 11 protruding relative to the third shell portion 13. An axial direction of the first shell portion 11 does not overlap with an axial direction of the second shell portion 12.

Figure 6:
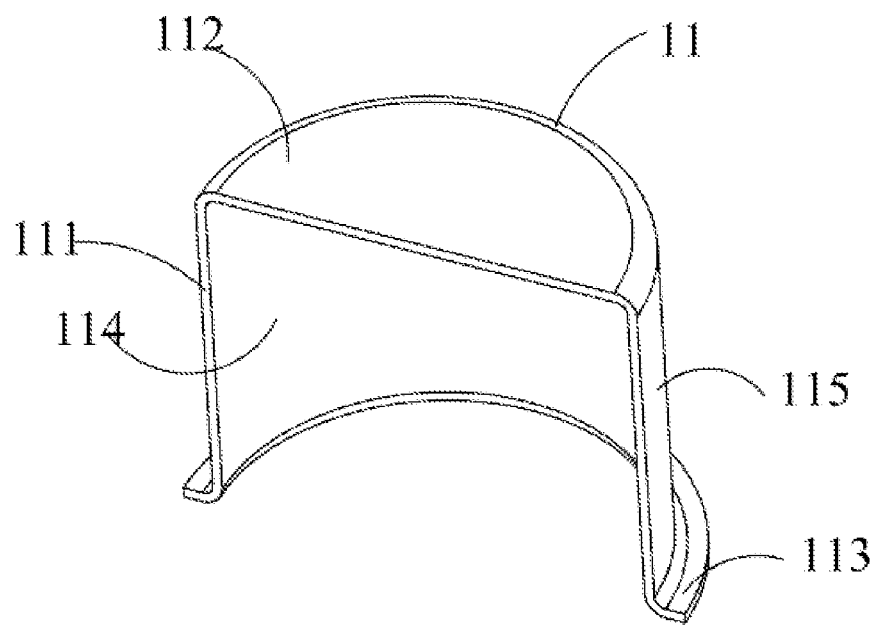
FIG. 6 is a schematic perspective cross-sectional view of a first shell portion of the present disclosure.
Figure 7:
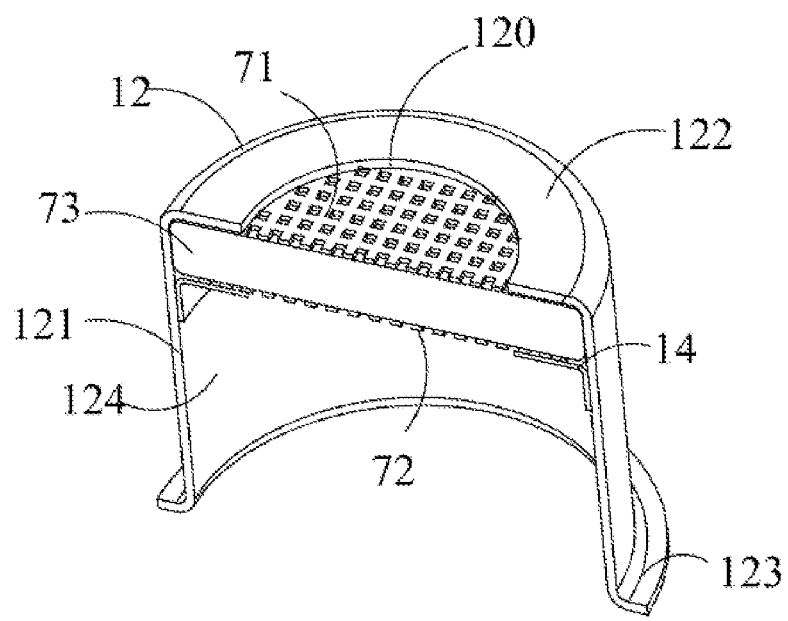
FIG. 7 is a schematic perspective cross-sectional view of a partial assembly including a second shell portion of the present disclosure.

As shown in FIG. 4, the shell 1 has a first cavity 101 and a second cavity 102 which are not communicated. At least part of the first shell portion 11 is located between the first cavity 101 and the second cavity 102. The first shell portion 11 is in sealing engagement with the third shell portion 13. The first cavity 101 is hermetically arranged. The first cavity 101 can accommodate normal environment air without leakage of the target gas. Referring to FIGS. 6 and 7, the first shell portion 11 has a first inner wall surface 114 and a first outer wall surface 115. The second shell portion 12 has a second inner wall surface 124. Correspondingly, a cavity wall of the shell forming the first cavity 101 includes at least part of the first inner wall surface 114. A cavity wall of the shell forming the second cavity 102 includes at least part of the first outer wall surface 115 and at least part of the second inner wall surface 124.

As shown in FIG. 4, an interlayer cavity between the first shell portion 11 and the second shell portion 12 forms the second cavity 102. Compared with the two cavities arranged laterally side by side in the related art, the shell of the gas detection probe 100 of the present disclosure is assembled and combined in a manner similar to a nesting doll. This makes the overall volume of the shell smaller, which is more conducive to the miniaturization of the gas detection probe 100. A portion of the second cavity 102 is located above the first cavity 101. In this way, a space in a vertical direction of the gas detection probe 100 can be utilized more reasonably. Both the first shell portion 11 and the second shell portion 12 may be cylindrical structures. The second shell portion 12 is a part of the outer shell of the gas detection probe 100. The first shell portion 11 is an inner shell.

The second shell portion 12 is further provided with a guide hole portion 120 disposed therethrough. The guide hole portion 120 communicates with the second cavity 102. The first element 21 is accommodated in the first cavity 101. The second element 22 is accommodated in the second cavity 102. In this way, due to the closed arrangement of the first cavity 101, the first element 21 located in the first cavity 101 will not be exposed to the gas in the external environment. The first element 21 only contacts the environment gas in the first cavity 101. For example, the gas in the first cavity 101 is air, that is, a mixed gas of oxygen, nitrogen and other gases, which may not be mixed with the target gas to be detected, such as R32 refrigerant gas. The first element 21 is thus used as a reference element. The guide hole portion 120 is provided through the shell 1. Specifically, the guide hole portion 120 extends through the second shell portion 12, so that the guide hole portion 120 facilitates communication between the second cavity 102 and the atmospheric environment outside the shell 1. The second element 22 is used as a detection element. In some embodiments, the concentration of the target gas in the environment can be detected by comparing the difference between the voltage signals corresponding to the first element 21 and the second element 22.

In order to facilitate the transmission of the electrical signals of the first element 21 and the second element 22, the gas detection probe 100 further includes a plurality of conductive terminals 3. At least part portion of each conductive terminal 3 is hermetically assembled and fixed with the shell 1. A part of the conductive terminals 3 among the plurality of conductive terminals 3 are electrically connected to the first element 21. Another part of the conductive terminals 3 among the plurality of conductive terminals 3 are electrically connected to the second element 22. Of course, in some embodiments, the conductive terminals 3 may be used as an injection-molded insert to form an integral structure with the third shell portion 13.

Figure 3:
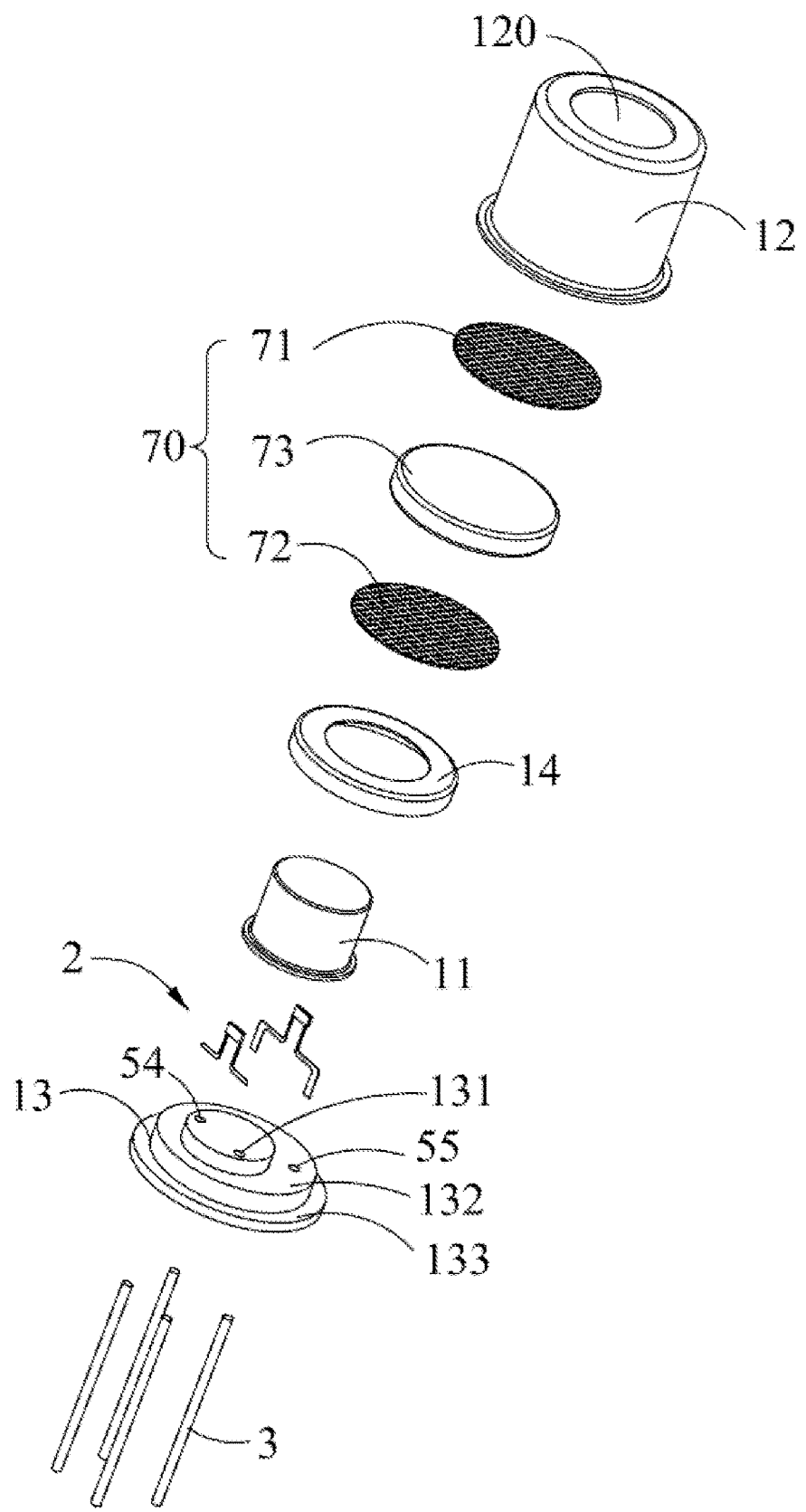
FIG. 3 is a schematic exploded structural view of the gas detection probe shown in FIG. 1.

As shown in FIG. 3, the third shell portion 13 includes a first support base 131, a second support base 132 and a third support base 133. The first support base 131 protrudes beyond the second support base 132. The second support base 132 protrudes beyond the third support base 133. On a plane perpendicular to the height direction of the gas detection probe 100, a projection of the first support base 131 is located within a projection range of the second support base 132. A projection of the second support base 132 is located within a projection range of the third support base 133. That is, an outer diameter of the first support base 131 is smaller than an outer diameter of the second support base 132. The outer diameter of the second support base 132 is smaller than an outer diameter of the third support base 133. The third shell portion 13 has a three-layer stepped structure.

The first support base 131 has a first peripheral wall 41. The first peripheral wall 41 is connected to the second support base 132. The second support base 132 has a second peripheral wall 42. The second peripheral wall 42 is connected to the third support base 133.

The first shell portion 11 has a first cylindrical wall 111, a first top wall 112 and a first flange wall 113. The first top wall 112 and the first flange wall 113 are located on different sides of the first cylindrical wall 111 along the height direction of the gas detection probe 100, respectively. The first cylindrical wall 111 surrounds the first support base 131. The first flange wall 113 protrudes beyond the first cylindrical wall 111 in a direction away from an axis of the first cylindrical wall 111.

The first cylindrical wall 111 and the first peripheral wall 41 are sealed and fixed by resistance welding; and/or, the first flange wall 113 and the second support base 132 are sealed and fixed by resistance welding. In addition, the existence of the first support base 131 also facilitates the positioning of the first shell portion 11, so that the first shell portion 11 is less likely to be dislocated and shaken during the assembly process. As a result, the connection and fixation between the first shell portion 11 and the third shell portion 13 are more convenient. The resistance welding is beneficial to ensure the sealing effect of the connection between the first shell portion 11 and the third shell portion 13. The sealing position may be located between the first cylindrical wall 111 and the first peripheral wall 41, or between the first flange wall 113 and the second support base 132. For example, after the first shell portion 11 is press-fitted to an outer peripheral side of the first support base 131, the resistance welding may be performed between a first flange wall 113 and the second support base 132. The first flange portion 113 can ensure a relatively large welding surface, which is beneficial to improve the sealing effect of the connection between the two components. Of course, in other embodiments of the present disclosure, methods such as laser welding or bonding may also be selected to achieve the sealing between the first shell portion 11 and the third shell portion 13.

The second shell portion 12 has a second cylindrical wall 121, a second top wall 122 and a second flange wall 123. The second top wall 122 and the second flange wall 123 are located on different sides of the second cylindrical wall 121 along the height direction of the gas detection probe 100, respectively. The second cylindrical wall 121 surrounds the second support base 132. The second flange wall 123 protrudes beyond the second cylindrical wall 121 in a direction away from an axis line of the second cylindrical wall 121.

The second cylindrical wall 121 is fixed to the second peripheral wall 42; and/or, the second flange wall 123 is fixed with the third support base 133. In addition, the existence of the second support base 132 also facilitates the positioning of the second shell portion 12, so that the second shell portion 12 is not easily displaced. Resistance welding is beneficial to ensure the fixing effect of the connection between the second shell portion 12 and the third shell portion 13. The fixed position of the resistance welding may be located between the second cylindrical wall 121 and the second peripheral wall 42, or between the second flange wall 123 and the third support base 133. For example, the resistance welding may be performed between the second flange wall 123 and the third support base 133 after the second shell portion 12 is press-fitted to an outer peripheral side of the second support base 132. The second flange wall 123 can ensure a relatively large welding surface, which is beneficial to improve the fixing effect between the two components. It should be noted that sealing between the second shell portion 12 and the third shell portion 13 may not necessarily be achieved, because the second cavity 102 needs to communicate with the external atmosphere. Therefore, it suffices that the second shell portion 12 and the third shell portion 13 can be fixed to each other.

Figure 8:
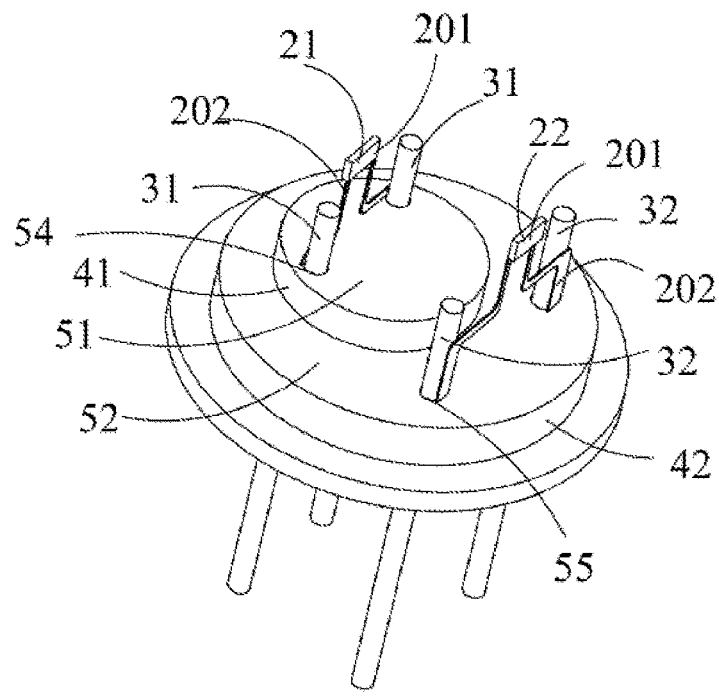
FIG. 8 is a schematic structural view of some components of the present disclosure after assembly.
Figure 9:
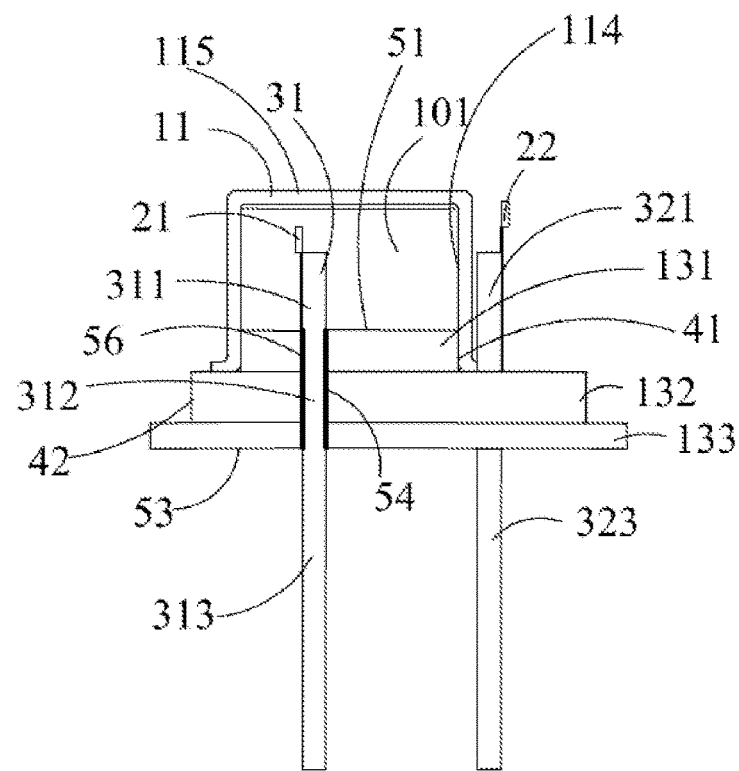
FIG. 9 is a schematic cross-sectional view of the structure after assembly of some components of the present disclosure.
Figure 10:
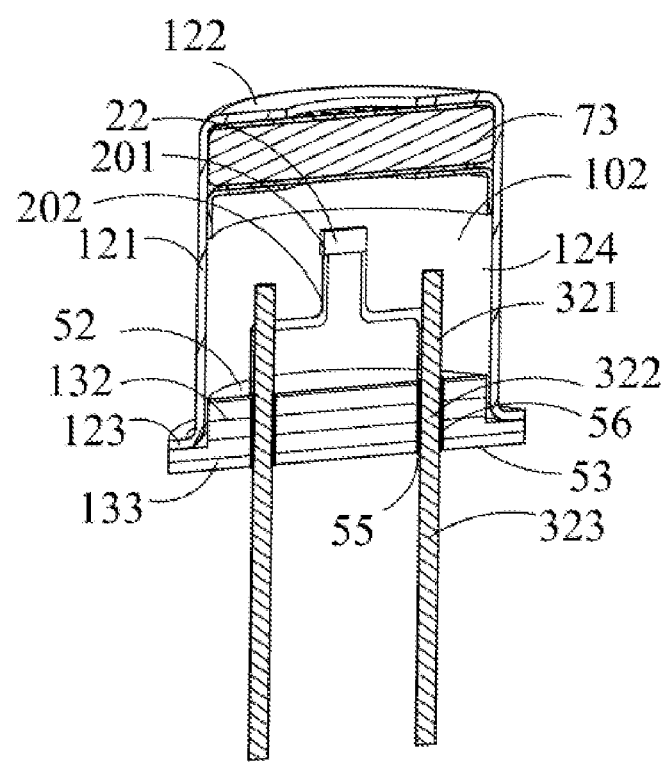
FIG. 10 is another schematic perspective cross-sectional view of the gas detection probe shown in FIG. 1.

Referring to FIGS. 8 and 9, the first support base 131 has a first top end surface 51 away from the second support base 132. The second support base 132 has a second top end surface 52 away from the third support base 133. The third support base 133 has a bottom end surface 53 away from the second support base 132. The third shell portion 13 includes a first hole portion 54 and a second hole portion 55. The first hole portion 54 extends through the first top end surface 51 and the bottom end surface 53. The second hole portion 55 extends through the second top end surface 52 and the bottom end surface 53.

The plurality of conductive terminals 3 include two first conductive terminals 31 and two second conductive terminals 32. At least part portion of each first conductive terminal 31 extends through the first hole portion 54, and the first conductive terminals 31 and the third shell portion 13 are sealed at the first hole portion 54. At least part portion of each second conductive terminal 32 extends through the second hole portion 55, and the second conductive terminals 32 and the third shell portion 13 are sealed at the second hole portion 55.

Specifically, referring to FIG. 9, the first conductive terminal 31 includes a first portion 311, a second portion 312 and a third portion 313. The second portion 312 is located between the first portion 311 and the third portion 313. The second portion 312 is received in the first hole portion 54. The second portion 312 and a hole wall of the first hole portion 54 formed by the third shell portion 13 are sealed and connected through an insulating medium 56. The first portion 311 is accommodated in the first cavity 101 and connected to the first element 21.

The second conductive terminal 32 includes a fourth portion 321, a fifth portion 322 and a sixth portion 323. The fifth portion 322 is located between the fourth portion 321 and the sixth portion 323. The fifth portion 322 is accommodated in the second hole portion 55. The fifth portion 322 and a hole wall of the second hole portion 55 formed by the third shell portion 13 are sealed and connected through the insulating medium 56. The fourth portion 321 is accommodated in the second cavity 102 and connected to the second element 22.

Both the third portion 313 and the sixth portion 323 are exposed on the bottom end surface 53 of the third shell portion 13.

The insulating medium 56 in the above embodiment may be selected to be glass or ceramic. For example, the conductive terminals and the third shell portion 13 may be fixed and sealed by means of glass frit. The advantage of doing so is to facilitate the manufacture of a boss structure of the third shell portion 13. The material of the third shell portion 13 may be selected from a metal material, so that the third shell portion 13 can be processed with a three-layer stepped structure by means of machining or the like. In order to avoid contact between the third shell portion 13 and the conductive terminals, the insulating medium 56 may be added between the conductive terminals and the third shell portion 13, so as to avoid short circuit due to contact between the two.

Referring to FIGS. 3 and 7, the guide hole portion 120 extends through the second top wall 122. The gas detection probe 100 further has a filter portion 70. The filter portion 70 is connected with the second top wall 122 at a periphery around the guide hole portion 120. The filter portion 70 is arranged to cover the guide hole portion 120 on a side adjacent to the second cavity 102. The filter portion 70 is configured for blocking solid or liquid foreign matter.

Since moisture and the like have a certain influence on the detection accuracy of the detection element 2, it needs to provide a complex humidity compensation algorithm to correct the detection result of the gas detection probe 100 in some related technologies. However, some software algorithms can only reduce the error to a certain extent, and in some application scenarios, the effect of the humidity compensation is not ideal. The present disclosure can effectively filter out solid impurities and liquid impurities through the filter portion 70, so as to further improve the detection accuracy of the gas detection probe 100.

As shown in FIG. 7, the gas detection probe 100 further includes a support plate 14. The support plate 14 is located between the first top wall 112 and the second top wall 122. The support plate 14 protrudes beyond the second cylindrical wall 121 along a direction approaching an axial of the second cylindrical wall 121. The support plate 14 has an annular structure with an opening in the middle. The support plate 14 may be fixed to the second cylindrical wall 121 by means of laser welding, resistance welding or the like.

A peripheral portion of the filter portion 70 is sandwiched and fixed between the second top wall 122 and the support plate 14. The filter portion 70 includes a first mesh portion 71, a second mesh portion 72, and a filter material 73 sandwiched between the first mesh portion 71 and the second mesh portion 72. The material of the filter material 73 may be activated alumina and/or activated carbon. The filter material 73 allows gas to pass through, but adsorbs liquid and solid impurities.

In some embodiments of the present disclosure, as shown in FIG. 8, the detection element 2 includes a thermistor portion 201 and a pin portion 202. That is, both the first element 21 and the second element 22 include the thermistor portion 201 and the pin portion 202. The pin portion 202 and the thermistor portion 201 are fixedly connected by laser welding. The pin portion 202 and the conductive terminal 3 are fixedly connected by laser welding or resistance welding.

In some embodiments, the thermistor portion 201 is a thin film thermistor. For example, the thermistor portion 201 includes a substrate, a thin film element layer provided on the substrate, a protective insulating layer, a conductive layer, and the like. The substrate may be formed by using materials such as ceramics, aluminum nitride, zirconia, or semiconductors such as silicon and germanium. A thickness dimension of the substrate is 50 μm to 150 μm. Through this ultra-thin substrate, high sensitivity and excellent thermal response can be achieved. The thin film element layer is a thermistor composition which is composed of an oxide semiconductor having a negative temperature coefficient. Of course, the thin film element layer may also be formed of an oxide semiconductor having a positive temperature coefficient. In addition, the thermistor portion 201 may not be limited to a thin film thermistor, but may be a thermistor element composed of semiconductors such as metal oxides, silicides, and nitrides. The protective insulating layer is a protective glass layer formed of borosilicate glass.

The pin portion 202 may be made of, for example, a material having low thermal conductivity. The pin portion 202 may be connected to the thermistor portion 201 by laser welding.

Figure 11:
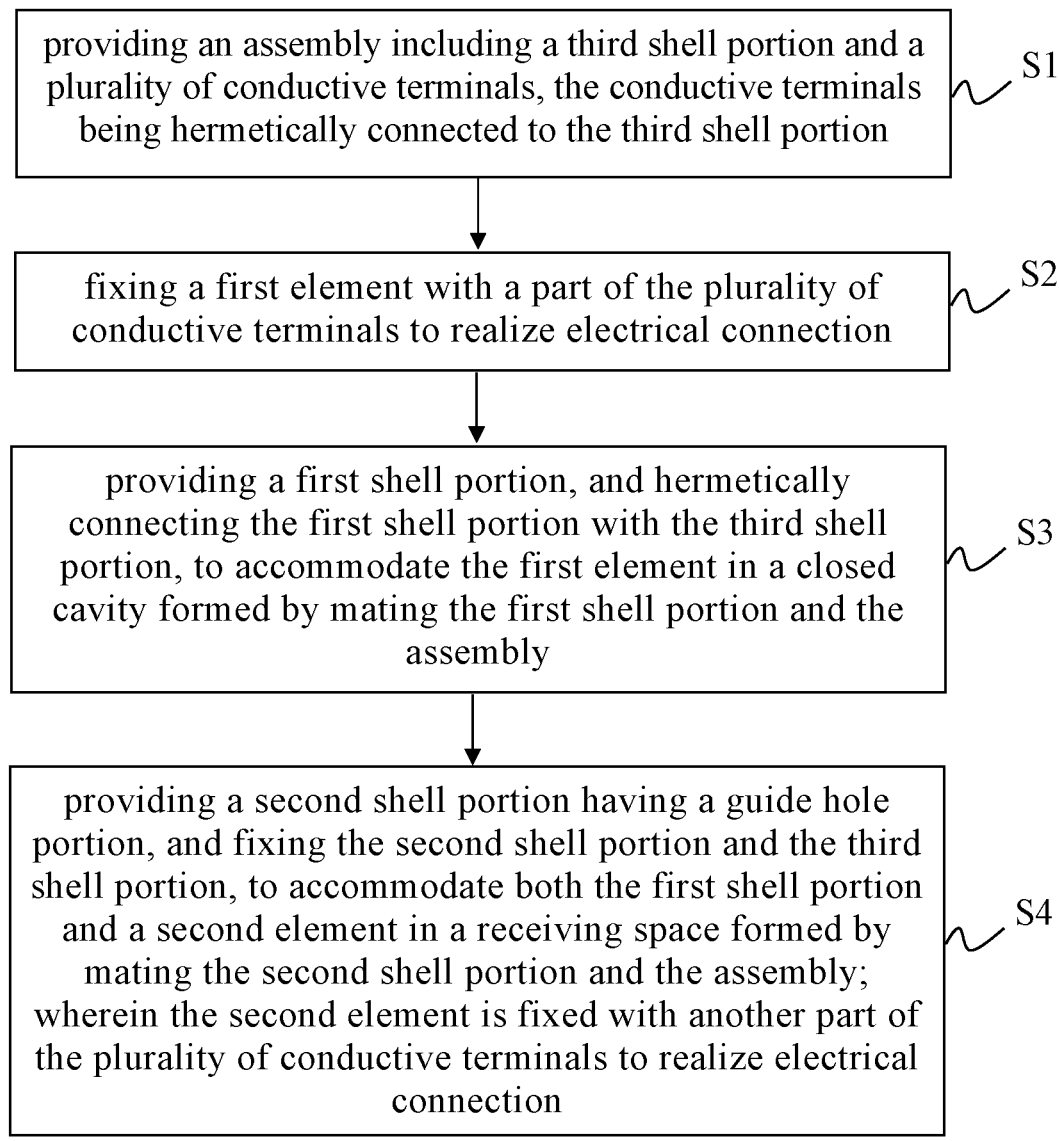
FIG. 11 is a schematic flowchart of a method for manufacturing the gas detection probe in accordance with an embodiment of the present disclosure.

As shown in FIG. 11, some embodiments of the present disclosure further provide a manufacturing method of a gas detection probe. The gas detection probe in the above embodiments may be manufactured by the manufacturing method, and the manufacturing method includes the following steps:

step S1, providing an assembly including the third shell portion 13 and the plurality of conductive terminals 3, the conductive terminals 3 being hermetically connected to the third shell portion;

step S2, fixing the first element 21 to a part of the conductive terminals 3 of the plurality of conductive terminals 3 to realize electrical connection;

step S3, providing the first shell portion 11, and hermetically connecting the first shell portion 11 and the third shell portion 13, to accommodate the first element 21 in a closed cavity formed by mating the first shell portion 11 and the assembly, the closed cavity being the first cavity in the foregoing embodiment; and step S4, providing the second shell portion 12 having the guide hole portion 120, and fixing the second shell portion 12 and the third shell portion 13, to accommodate both the first shell portion 11 and the second element 22 in a receiving space formed by mating the second shell portion 12 and the assembly; wherein the second element 22 is fixed with another part of the conductive terminals 3 among the plurality of conductive terminals 3 to realize electrical connection.

Exemplarily, the third shell portion 13 has a plurality of openings. The conductive terminals 3 pass through the openings and are hermetically connected to the third shell portion 13.

The plurality of openings include two first hole portions 54 and two second hole portions 55. The plurality of conductive terminals 3 include two first conductive terminals 31 and two second conductive terminals 32. The third shell portion 13 may be made of metal material, so as to facilitate processing and welding with other shells. When manufacturing the abovementioned assembly, the first conductive terminal 31 may be arranged to pass through the first hole portion 54, and the second conductive terminal may be arranged to pass through the second hole portion 55. In some embodiments, the insulating material 56 may be added while the conductive terminal 3 is arranged to passing through the opening. An insulating material is used to isolate the conductive terminals and a hole wall that forms the opening of the third shell portion, so as to avoid short circuit due to contact between the two.

After the step S2, or after the step S1 and before the step S2, the second element 22 may be fixed to another part of the conductive terminals 3 of the plurality of conductive terminals 3 to achieve electrical connection. Then the step S3 is performed. Of course, the step of fixing the second element 22 to another part of the conductive terminals 3 among the plurality of conductive terminals 3 may also be performed after the step S3. The present disclosure does not limit this too much.

According to the abovementioned manufacturing method of the gas detection probe, by hermetically connecting the first shell portion and the third shell portion, the first element is accommodated in the closed cavity formed by mating the first shell portion and the assembly; and by fixing the second shell portion and the third shell portion, the first shell portion and the second element are both accommodated in the receiving space formed by mating the second shell portion and the assembly. This is more beneficial to reduce the space occupied by the shell of the gas detection probe in the direction perpendicular to the height direction. Accordingly, it is beneficial to manufacture a more miniaturized gas detection probe.

In some embodiments of the present disclosure, a gas detection device which can detect the concentration of gases such as refrigerants is provided. The device may include the gas detection probe 100 provided in the above embodiments, a processing chip and other structures.

Figure 12:
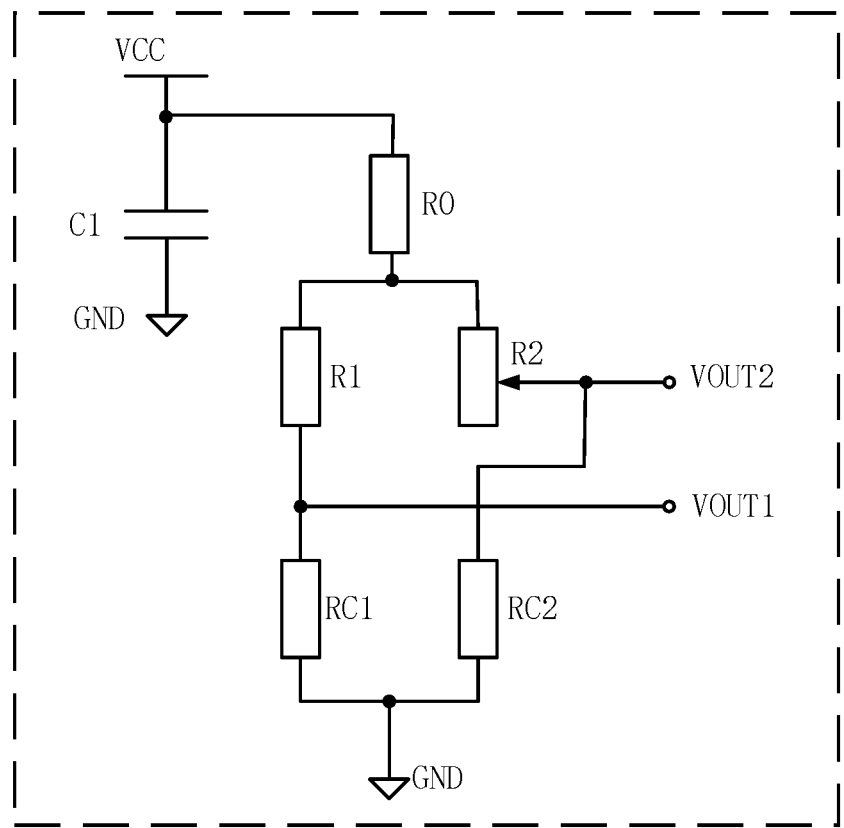
FIG. 12 is a schematic view of a circuit structure of a gas detection device in accordance with an embodiment of the present disclosure.

A circuit structure of the gas detection device provided by the present disclosure is shown in FIG. 12. The gas detection device includes a first resistor R1 and a second resistor R2. The second resistor R2 may be a variable resistor. The gas detection device further includes a power input terminal VCC, a first signal output terminal VOUT1, a second signal output terminal VOUT2 and a ground terminal GND.

The power input terminal VCC is used to provide DC voltage. For example, the power input terminal VCC may be a DC voltage of 5V. The first resistor R1, the second resistor R2, the first element RC1 corresponding to the gas detection probe 100, and the second element RC2 corresponding to the gas detection probe 100 form a bridge circuit in the form of a Wheatstone bridge.

The first resistor R1 is electrically connected between the power input terminal VCC and the first signal output terminal VOUT1. The first element RC1 corresponding to the gas detection probe 100 is electrically connected between the first signal output terminal VOUT1 and the ground terminal GND.

The second resistor R2 is electrically connected between the power input terminal VCC and the second signal output terminal VOUT2. The second element RC2 corresponding to the gas detection probe 100 is electrically connected between the second signal output terminal VOUT2 and the ground terminal GND. Both the first signal output terminal VOUT1 and the second signal output terminal VOUT2 are electrically connected to the processing chip.

In some embodiments, the gas detection device further includes a voltage dividing resistor R0. The voltage dividing resistor R0 can divide the voltage of the above bridge circuit to a certain extent, so that the voltage of part of the bridge circuit is relatively more stable.

In practice, thermal conductivities of different gases are different. For example, the thermal conductivity of the air is 26.2 mW/mK, the thermal conductivity of R32 refrigerant gas is 12.6 mW/mK, the thermal conductivity of carbon dioxide gas is 16.8 mW/mK, and so on. Taking the R32 refrigerant gas as an example, since the thermal conductivity of R32 refrigerant gas is only about ½ of that of the air, the heat dissipation performance of the second element as the detection element decreases in the environment where the R32 refrigerant gas exists. Correspondingly, the temperature of the second element increases, and the resistance value decreases, while the resistance value of the first element as the reference element does not change under the same indoor temperature. Therefore, in the bridge circuit provided in FIG. 12, the difference between the first signal output terminal VOUT1 and the second signal output terminal VOUT2 will generate a difference in voltage signal due to the change of the resistance value of the second element RC2. When the concentration of R32 refrigerant gas in the environment is higher, the difference between the first signal output terminal VOUT1 and the second signal output terminal VOUT2 will be larger, so that the difference of the voltage signal can reflect the concentration of the R32 refrigerant gas to a certain extent.

Figure 13:
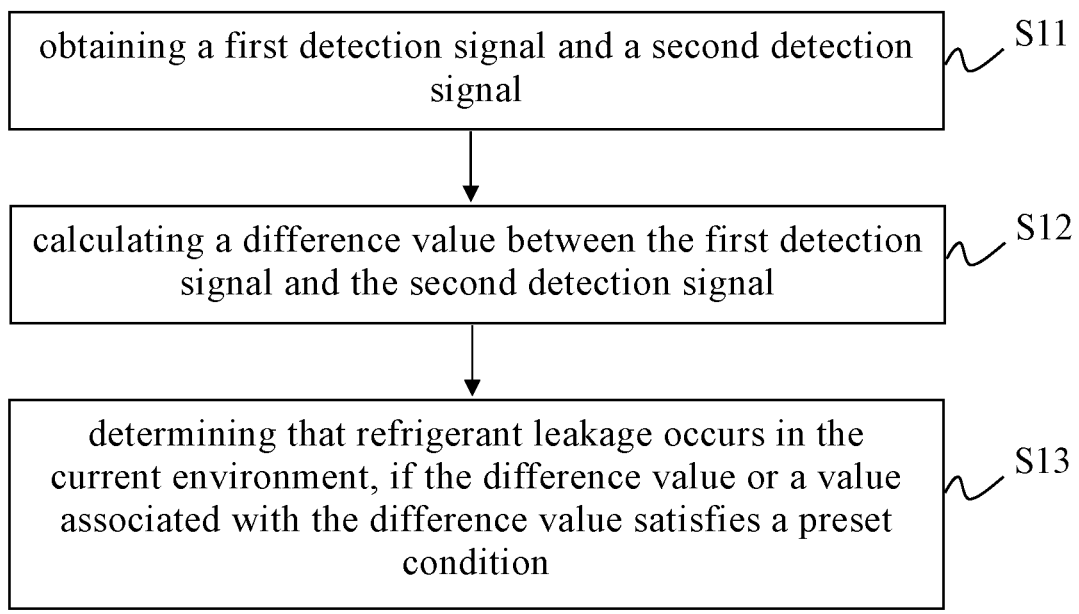
FIG. 13 is a schematic flowchart of a method for detecting refrigerant leakage in accordance with an embodiment of the present disclosure.

As shown in FIG. 13, the present disclosure further provides a refrigerant gas detection method. The detection method is applied to a gas detection device including a gas detection probe and a circuit board. The gas detection probe has a sealed first cavity and a second cavity communicated with the environment. The gas detection probe also includes a first element located in the first cavity and a second element located in the second cavity. The resistance values of both the first element and the second element can vary with the gas concentration.

The detection method includes the following steps:

step S11, obtaining a first detection signal and a second detection signal;

step S12, calculating a difference value between the first detection signal and the second detection signal; and step S13, determining that refrigerant leakage occurs in the current environment, if the difference value or a value associated with the difference value satisfies a preset condition.

It can be known from FIG. 12 that the first detection signal may be a voltage signal obtained from the first signal output terminal VOUT1, and the second detection signal may be a voltage signal obtained from the second signal output terminal VOUT2. Since the voltage difference between the first signal output terminal VOUT1 and the second signal output terminal VOUT2 can reflect the concentration of the R32 refrigerant gas to a certain extent, the preset condition in step S13 may include that the difference between the first detection signal and the second detection signal is greater than or equal to a certain preset threshold. That is, after the difference value or the value associated with the difference value is greater than a specific value, it can be considered that refrigerant leakage occurs in the environment. It should be noted that the value associated with the difference value may not necessarily be the difference value in voltage. For example, the difference value in voltage may be converted into a specific value of concentration for determination.

The above embodiments are only used to illustrate the present disclosure and not to limit the technical solutions described in the present disclosure. The understanding of this specification should be based on those skilled in the art. Descriptions of directions, although they have been described in detail in the abovementioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A gas detection probe, comprising:
    a detection element comprising a first element and a second element, a resistance value of the detection element being changeable with change of gas concentration; and
    a shell comprising a first shell portion, a second shell portion and a third shell portion, at least part of the first shell portion and at least part of the second shell portion protruding beyond the third shell portion along a height direction of the gas detection probe, the second shell portion and the third shell portion being mated and formed at an outer peripheral side of the first shell portion, at least part of the second shell portion circumferentially surrounding the first shell portion;
    wherein the shell has a first cavity and a second cavity which are not communicated, at least part of the first shell portion is located between the first cavity and the second cavity, the first shell portion is in sealing connection with the third shell portion, the first cavity is hermetically arranged, the second shell portion is provided with a guide hole portion extending therethrough, the guide hole portion communicates with the second cavity, the first element is accommodated in the first cavity, and the second element is accommodated in the second cavity.

2. The gas detection probe according to claim 1, wherein the first shell portion and the third shell portion are hermetically connected by welding or bonding; and
the second shell portion and the third shell portion are connected by welding or bonding, or the second shell portion and the third shell portion are integrally formed.

3. The gas detection probe according to claim 2, wherein a height of the second shell portion protruding relative to the third shell portion is higher than that of the first shell portion protruding relative to the third shell portion; the second shell portion and the third shell portion are mated to form a receiving space for receiving the first shell portion; and an axial direction of the first shell portion does not overlap with an axial direction of the second shell portion.

4. The gas detection probe according to claim 3, wherein the third shell portion comprises a first support base and a second support base; the first support base protrudes beyond the second support base; on a plane perpendicular to the height direction of the gas detection probe, a projection of the first support base is located within a projection range of the second support base; the first support base has a first peripheral wall which is connected with the second support base.

5. The gas detection probe according to claim 4, wherein the first shell portion has a first cylindrical wall, a first top wall and a first flange wall; the first top wall and the first flange wall are located on different sides of the first cylindrical wall along the height direction of the gas detection probe, respectively; the first cylindrical wall surrounds the first support base, the first flange wall protrudes beyond the first cylindrical wall in a direction away from an axis of the first cylindrical wall; and
the first cylindrical wall and the first peripheral wall are sealed and fixed by resistance welding; and/or, the first flange wall and the second support base are sealed and fixed by resistance welding.

6. The gas detection probe according to claim 5, wherein the third shell portion further comprises a third support base; the second support base protrudes beyond the third support base; on a plane perpendicular to the height direction of the gas detection probe, a projection of the second support base is located within a projection range of the third support base, the second support base has a second peripheral wall which is connected with the third support base.

7. The gas detection probe according to claim 6, wherein the second shell portion has a second cylindrical wall, a second top wall and a second flange wall; the second top wall and the second flange wall are located on different sides of the second cylindrical wall along the height direction of the gas detection probe, respectively; the second cylindrical wall surrounds the second support base, the second flange wall protrudes beyond the second cylindrical wall in a direction away from an axis of the second cylindrical wall; and
the second cylindrical wall is fixed with the second peripheral wall; and/or, the second flange wall is fixed with the third support base.

8. The gas detection probe of claim 7, further comprising a plurality of conductive terminals, the plurality of conductive terminals comprising a first conductive terminal and a second conductive terminal;
wherein the first support base has a first top end surface away from the second support base, the second support base has a second top end surface away from the third support base, the third support base has a bottom end surface away from the second support base, the third shell portion comprises a first hole portion and a second hole portion, the first hole portion extends through the first top end surface and the bottom end surface, the second hole portion extends through the second top end surface and the bottom end surface;
wherein the first conductive terminal at least partially extends through the first hole portion, the first conductive terminal and the third shell portion are sealed at the first hole portion, the first conductive terminal is electrically connected to the first element; and
wherein the second conductive terminal at least partially extends through the second hole portion, the second conductive terminal and the third shell portion are sealed at the second hole portion, and the second conductive terminal is electrically connected to the second element.

9. The gas detection probe according to claim 8, wherein the first conductive terminal comprises a first portion, a second portion and a third portion, the second portion is located between the first portion and the third portion, the second portion is accommodated in the first hole portion, the second portion and a hole wall of the first hole portion formed by the third shell portion are hermetically connected through an insulating medium, the first portion is accommodated in the first cavity and connected with the first element;
wherein the second conductive terminal comprises a fourth portion, a fifth portion and a sixth portion, the fifth portion is located between the fourth portion and the sixth portion, the fifth portion is accommodated in the second hole portion, the fifth portion and a hole wall of the second hole portion formed by the third shell portion are hermetically connected through an insulating medium, the fourth portion is accommodated in the second cavity and connected with the second element; and
both the third portion and the sixth portion are exposed on the bottom end surface of the third shell portion.

10. The gas detection probe according to claim 8, wherein the guide hole portion extends through the second top wall, the gas detection probe further comprises a filter portion, the filter portion is connected with the second top wall at a periphery surrounding the guide hole portion, the filter portion is arranged to cover the guide hole portion at a side adjacent to the second cavity, and the filter portion is configured for blocking solid or liquid foreign matter.

11. The gas detection probe according to claim 10, further comprising a support plate located between the first top wall and the second top wall, the support plate protruding beyond the second cylindrical wall along a direction approaching an axial of the second cylindrical wall.

12. The gas detection probe according to claim 11, wherein a peripheral portion of the filter portion is sandwiched and fixed between the second top wall and the support plate, the filter portion comprises a first mesh portion, a second mesh portion, and a filter material sandwiched between the first mesh portion and the second mesh portion, and the filter material is activated alumina and/or activated carbon.

13. The gas detection probe according to claim 8, wherein the detection element comprises a thermistor portion and a pin portion; the pin portion and the thermistor portion are fixedly connected by laser welding; and the pin portion and the conductive terminal are fixedly connected by laser welding or resistance welding.

* * * * *